US006837664B2

(12) United States Patent
Blakesley et al.

(10) Patent No.: US 6,837,664 B2
(45) Date of Patent: Jan. 4, 2005

(54) MULTIPLE HEAD ROTARY SET-UP

(75) Inventors: Donovan R. Blakesley, Nelson, MN (US); Paul H. Wagner, Alexandria, MN (US); Jeremiah D. Rumohr, Alexandria, MN (US); David L. Anderson, Alexandria, MN (US)

(73) Assignee: Douglas Machine, Inc., Alexandria, MN (US)

( * ) Notice: Subject to any disclaimer, the term of this patent is extended or adjusted under 35 U.S.C. 154(b) by 104 days.

(21) Appl. No.: 10/238,456

(22) Filed: Sep. 10, 2002

(65) Prior Publication Data
US 2004/0047715 A1 Mar. 11, 2004

(51) Int. Cl.[7] .................................................. B65H 3/08
(52) U.S. Cl. .................. 414/416.01; 414/736; 414/737; 414/732; 198/474.1; 271/91
(58) Field of Search ............................ 414/416.01, 732, 414/736, 737; 198/377.02–377.06, 474.1, 475.1, 797; 271/91, 95

(56) References Cited

U.S. PATENT DOCUMENTS

| | | | |
|---|---|---|---|
| 3,386,558 A | | 6/1968 | Benatar |
| 3,937,458 A | * | 2/1976 | Langen ........................ 271/95 |
| 4,530,686 A | * | 7/1985 | Everson et al. ............. 493/315 |
| 4,537,587 A | * | 8/1985 | Langen ........................ 493/315 |
| 4,643,633 A | | 2/1987 | Lashyro |
| 4,822,234 A | | 4/1989 | Johnson et al. |
| 5,019,207 A | | 5/1991 | McCoy |
| 5,234,314 A | | 8/1993 | Ganz |
| 5,249,916 A | | 10/1993 | Portrait et al. |
| 5,336,029 A | | 8/1994 | Kato et al. |
| 5,456,570 A | | 10/1995 | Davis, Jr. et al. |
| 5,503,519 A | | 4/1996 | Schwetz et al. |
| 5,676,519 A | | 10/1997 | Canziani et al. |
| 5,984,624 A | | 11/1999 | Opfer et al. |
| 5,997,458 A | | 12/1999 | Guttinger et al. |

* cited by examiner

Primary Examiner—Kathy Matecki
Assistant Examiner—Mark A. Deuble
(74) Attorney, Agent, or Firm—Alan D. Kamrath; Nikolai & Mersereau, P.A.

(57) ABSTRACT

A rotary unloader (10) removes articles (26) from a magazine (24) and includes a carriage (12) rotating about a primary axis and a carrier (14), attached to the carriage (12), rotating about a secondary axis. The secondary axis is separated from the primary axis by a first radial spacing. The carrier (14) may have one or more handlers (16) attached at a second radial spacing. Where the carrier (14) includes multiple handlers (16), they may advantageously be equidistantly spaced and circumferentially located around the carrier (14). The first radial spacing is smaller than the second radial spacing to ensure an outward disposition of the handler (16) with regard to the primary axis. Rotation of the carriage (12) about the primary axis may be coupled to the rotation of the carrier (14) about the secondary axis by a gear system. The simultaneous rotation of the carriage (12) and the carrier (14) cooperates to produce a reciprocal motion of the handler (16). The handler (16) removes articles (26) from the magazine (24) during the reciprocal motion in order to minimize roll back or other problems. The rotary unloader (10) transports the article (26) to a receiver (30) and places the article (26) on the receiver (30) during a subsequent reciprocal motion. The receiver (30) may comprise an endless conveyor (90) and may have flights to capture and possibly shape the article (26) for further processing.

20 Claims, 3 Drawing Sheets

MULTIPLE HEAD ROTARY SET-UP

BACKGROUND OF THE INVENTION

This invention relates to methods and apparatus for transporting articles from a magazine. In particular, this invention relates to methods and apparatus that use a rotary mechanism that employs an offset shaft to unload articles from a magazine.

In typical assembly line operations, articles must be removed from a magazine and transported to an assembly line in a continuous fashion. Rotary unloaders are commonly used to unpack articles from a magazine. The transport of the articles should be accomplished in a manner to place the articles in a position convenient for further processing. For example, articles such as corrugated trays may be removed from a magazine and placed onto the assembly line in a position suitable for packaging products. In other preferred aspects, lids may be placed on boxes or labels may be applied to packages. Because of the high-speed operation of assembly lines, these unpacking devices must provide reliable, high-speed transport. Rotary devices are often used to provide high speed transport.

However, rotary devices, when removing an article from a magazine, are subject to the problem of roll back into a following article because of the rotational movement. Also, placement of the article on a receiver is more violent when using rotational movement. Thus, it is generally desirable for the rotary unloader to remove articles from the magazine using a substantially linear motion. It is also often desirable for the rotary unloader to place the article using a generally linear motion. The linear motion facilitates removal of the article from the magazine without undue damage to the article.

Some rotary unloaders employ multiple axes of rotation and reciprocating motion in order to achieve a generally linear motion when removing articles from a magazine. With these rotary unloaders, care must be taken to ensure that the article is not disturbed by the mechanism of the rotary unloader. Thus, it is desirable that the rotary mechanism maintains an outward disposition of the article being transported. This disposition may be accomplished using additional axes of rotation and selection of gear ratios. For example, U.S. Pat. No. 4,643,633 to Lashyro employs a system using three axes of rotation to maintain an outward disposition of an article as it is transferred from a pick position to a place position. However, employing multiple axes of rotation complicate the design and function of a rotary device. With rotary unloaders that do not maintain an outward disposition of transported articles, such as disclosed in U.S. Pat. No. 5,019,207 to McCoy, the rotary unloader structure must allow for clearance for movement through an inwardly disposed position. This further limits the size of the article that may be transported. Moving the article through an inwardly disposed position also increases the amount of travel the article must move through between the pick location and the place location.

Rotary unloaders may operate more efficiently and quickly by employing multiple handlers to transport items. Rotary unloaders have employed multiple handlers where distinct gear systems are used to drive each handler in order to provide a reciprocating action during the picking and placing motions. While improving efficiency, each additional distinctly driven handler multiplies the complexity of the mechanism of the rotary unloader.

These shortcomings are inherent in the design of current rotary unloaders. There is therefore a need for methods and apparatus using a rotary unloader that do not suffer from the deficiencies of existing apparatus. In particular, there is a need for methods and apparatus that allow for quick and efficient unloading that maintain an outward disposition of a transported article without multiplying the complexity of the unloader. These methods and apparatus should provide a reciprocating action during picking and placing motions while minimizing the travel of the article. There further exists a need for methods and apparatus that allow for multiple handlers driven by a single gear system. There is also a need for methods and apparatus using a rotary unloader for transporting articles from a magazine that minimize the possibility of mishandling the article and of interrupting the assembly line process because of rotational movement. Furthermore, rotary unloaders that employ a continuous motion may operate at higher speeds than unloaders that must interrupt rotational motion to achieve a linear motion for unloading. In addition, methods and apparatus employing a continuous motion may be more reliable and employ fewer moving parts in order to accomplish the unloading.

SUMMARY

The present invention solves these needs and other problems of rotary unloaders by providing, in most preferred aspects, a rotary unloader having a carriage rotating about a primary axis and a carrier, attached to the carriage, rotating about a secondary axis. A plurality of handlers are mounted to the carrier. The rotation of the carriage and the simultaneous rotation of the carrier cooperate to produce a reciprocating movement allowing each handler to sequentially remove articles from a magazine.

In other aspects of the present invention, a subsequent reciprocating movement allows each handler to place an engaged article upon a receiver.

In further aspects of the present invention, the rotary unloader has a first radial spacing between the primary axis and the secondary axis and a second radial spacing between the secondary axis and the plurality of handlers. The first radial spacing is smaller than the second radial spacing to maintain an outward disposition of an article being transported.

It is thus an object of the invention to provide novel methods and apparatus that provide fast and efficient rotary unloading.

It is yet another object of the invention to provide such novel methods and apparatus for rotary unloading that employ multiple handlers mounted on a single carrier.

It is yet another object of the invention to provide such novel methods and apparatus for rotary unloading that employ multiple handlers driven by a common gear system.

It is yet another object of the invention to provide such novel methods and apparatus for rotary unloading that maintain an outward disposition of articles being transported relative to a primary axis.

It is yet another object of the invention to provide such novel methods and apparatus for rotary unloading that reduce movement of the article during transport.

It is yet another object of the invention to provide such novel methods and apparatus for rotary unloading that shape the article being transported upon placement on a receiver.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
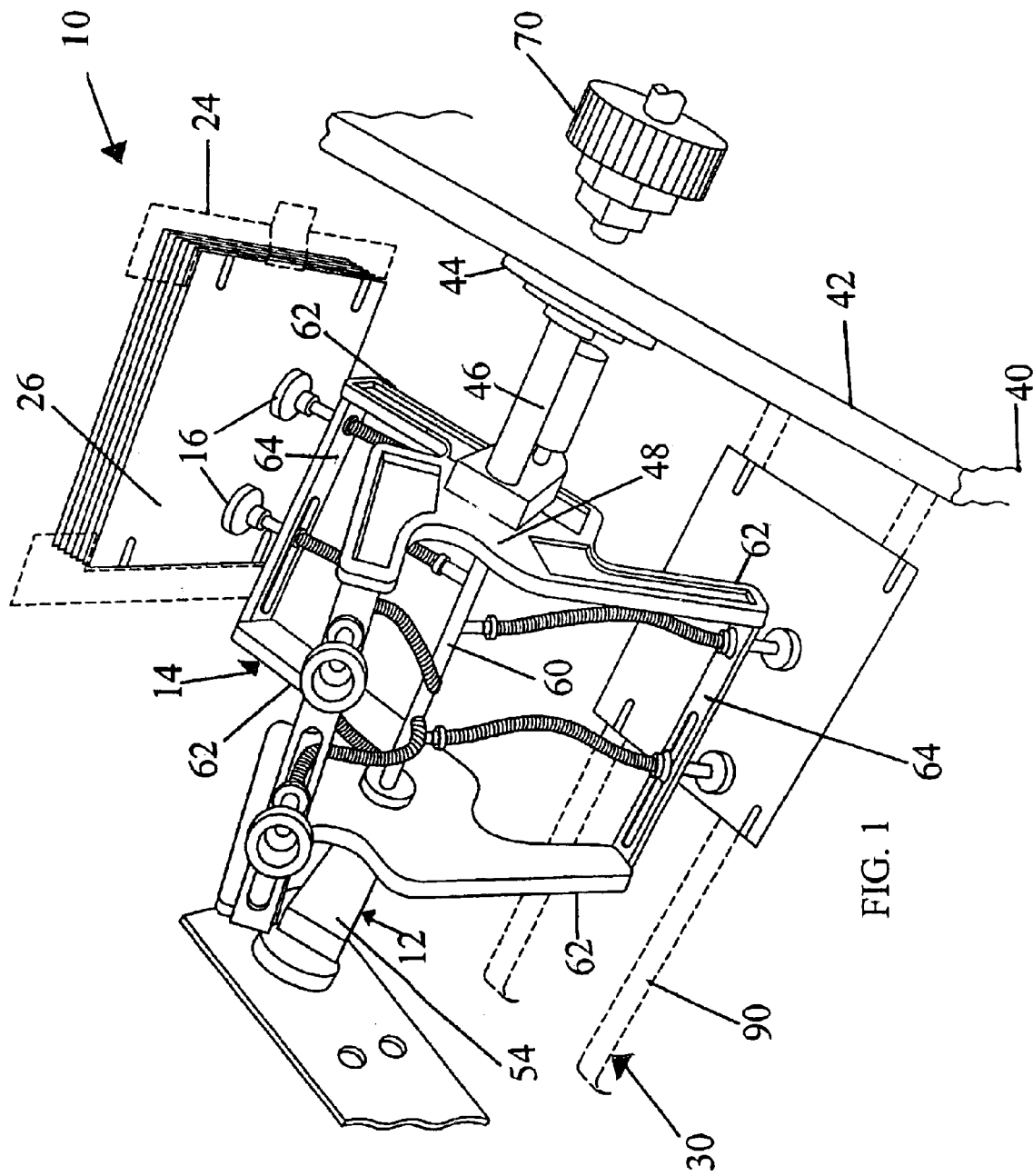
FIG. 1 shows a partial, perspective view of a rotary unloader utilizing preferred methods according to the preferred teachings of the present invention.
Figure 2:
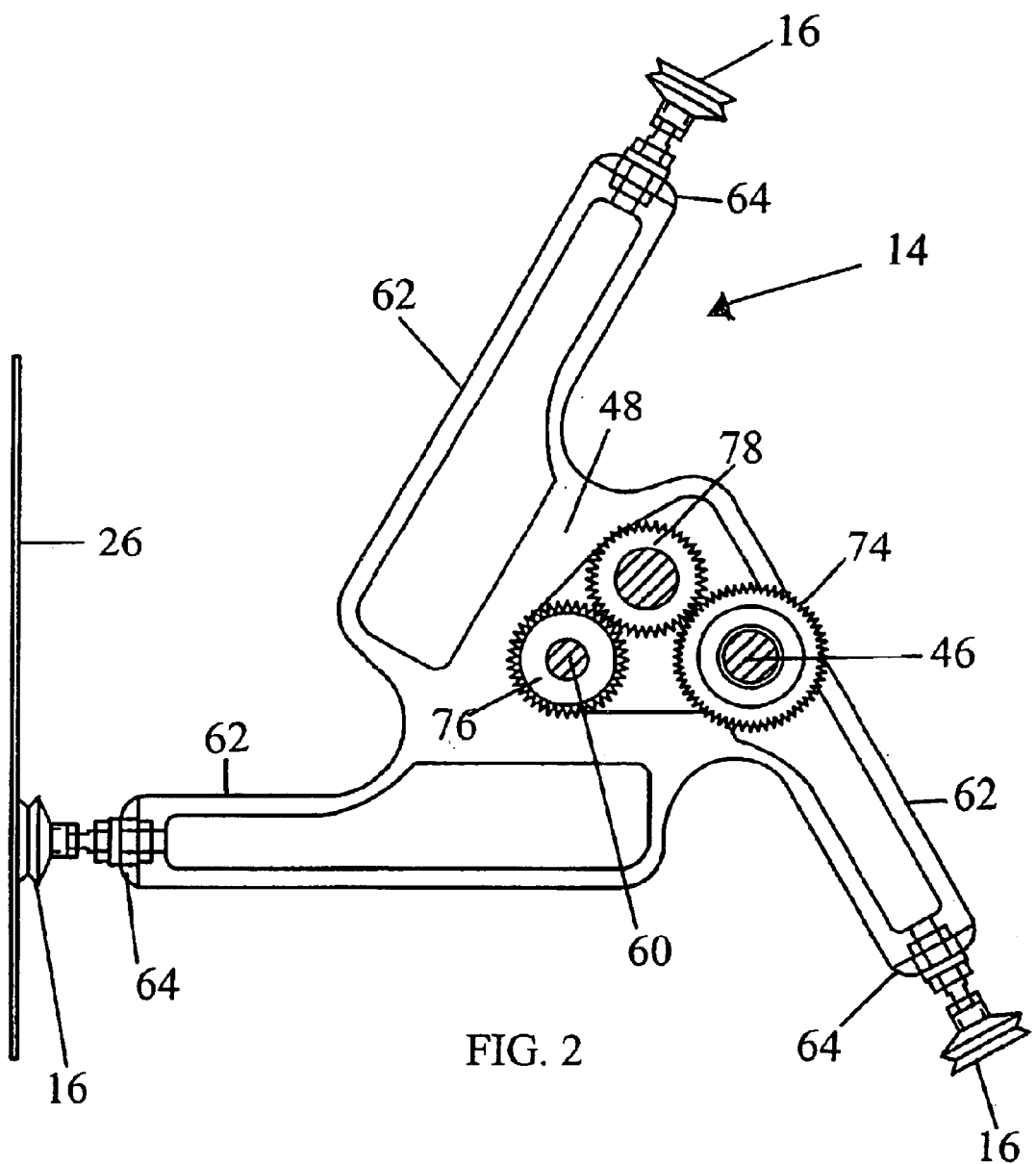
FIG. 2 shows a side view of the carrier of the rotary unloader of FIG. 1.
Figure 3:
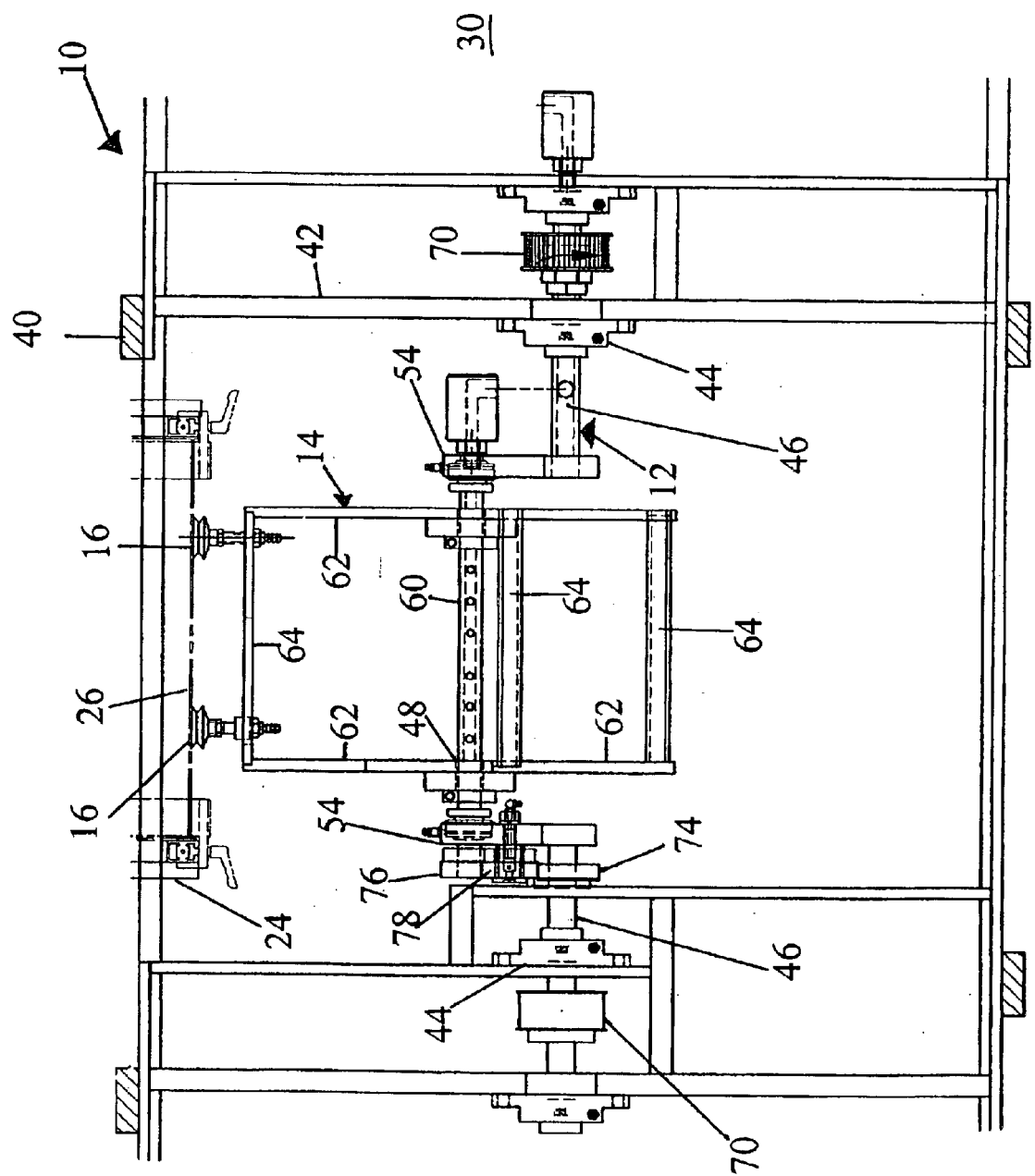
FIG. 3 shows a top view of the rotary unloader of FIG. 1.

All figures are drawn for ease of explanation of the basic teachings of the present invention only; the extensions of the figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "side," "end," "bottom," "first," "laterally," "longitudinally," "row," "column," and similar terms are used herein, it should be understood that these terms have reference only to the structure shown in the drawings as it would appear to a person viewing the drawings and are utilized only to facilitate describing the illustrative embodiment.

DESCRIPTION OF THE PREFERRED EMBODIMENTS

An apparatus for rotary unloading of articles utilizing methods according to the preferred teachings of the present invention, hereinafter identified as a rotary unloader, is shown in the drawings and is generally designated 10. The rotary unloader 10 has a carriage 12 mounted to rotate about a primary axis. A carrier 14 is attached to the carriage 12 and is mounted to rotate about a secondary axis. The secondary axis is offset from the primary axis by a first radial spacing. A handler 16 is attached to the carrier 14 and rotates with the carrier 14 about the secondary axis. The structure of the carrier 14 provides for a second radial spacing between the handler 16 and the secondary axis.

The carrier 14 rotates about the secondary axis, with the rotation about the secondary axis being in an opposite direction relative to the rotation of the carriage 12 about the primary axis in the preferred form. The simultaneous and opposing rotations of the carrier 14 and the carriage 12 cooperate to produce a reciprocating movement of the handler 16 at various points of the rotation. Selection of a ratio of rotation about the primary axis to rotation about the secondary axis, of a ratio of radial spacings, and of the particular handlers 16 control the location and number of the reciprocating movements.

In the preferred form of the invention, the rotary unloader 10 employs a ratio of these rotations that ensures that the reciprocating movements occur at the same location during each cycle of the rotary unloader 10. In the preferred form, a cycle of the rotary unloader 10 may be defined by the complete rotation of the more slowly rotating part between the carrier 14 and the carriage 12 around the primary axis. In this preferred form, the carrier 14 will rotate at a slower rate than the carriage 12. For example, a ratio of three rotations about the primary axis to one rotation about the secondary axis will result in the handler 16 having four reciprocal movements during one rotation about the secondary axis. In this example, each of the reciprocal movements will have a peak separated by ninety-degree intervals. Having determined the locations of the reciprocal movements, a magazine 24 containing a plurality of articles 26 for unloading may be disposed at one such location. A receiver 30 in the most preferred form for transporting the article 26 may be disposed at a subsequent location. In an example embodiment, the handler 16 moves through a reciprocating movement to unload an article 26, such as a corrugated tray, during each cycle of the rotary unloader 10, from the magazine 24. The rotary unloader 10 then employs a subsequent reciprocating movement of the handler 16 to deposit the article 26 on the receiver 30. In this embodiment, the article 26 can be moved from a vertical position in the magazine 24 to a horizontal position on the receiver 30.

In further aspects of the invention, the number of reciprocating movements of the handler 16 during each cycle may be selected to correspond to the size of the articles 26 being transported, a number of desired handlers 16 or both of these considerations in order to maximize efficiency. In one embodiment, the size of the articles 26 may be used to determine an optimal spacing between the magazine 24 and receiver 30. The spacing between the magazine 24 and receiver 30 then determines a number of handlers 16 to be circumferentially mounted on the carrier 14. The number of handlers 16 is a consideration in selecting the ratio of the rotation of the carrier 14 to the rotation of the carriage 12. Other considerations may include the desired linearity of the reciprocal movement and the ratio of radial spacings.

In one preferred embodiment, the carriage 12 is mounted for rotation about the primary axis on a housing 40 that provides support for the rotary unloader 10. The housing 40 comprises a frame 42 that supports the carriage 12 on at least two points along the primary axis. A bearing 44 provides for rotatable mounting between the carriage 12 and the housing 40. By way of example and not limitation, the carriage 12 comprises two carriage shafts 46 rotatably mounted on the housing 40 coaxial with the primary axis and spaced from each other, leaving a gap along the primary axis.

In this preferred embodiment, the carrier 14 is mounted for rotation about the secondary axis on the carriage 12 in the gap between the shafts 46. In the embodiment shown, the secondary axis is parallel to the primary axis, but separated by a first radial spacing. The secondary axis is offset from the primary axis in the preferred form by providing the carriage 12 with a radial extension 54 at the inward end of each carriage shaft 46, relative to the carrier 14. Each extension 54 rotatably mounts the carrier 14 allowing the carrier 14 to rotate about the secondary axis.

In the embodiment shown, the carrier 14 includes a central portion 48 having a carrier shaft 60. The carrier shaft 60 is coaxial with the secondary axis and is attached at each end to the extensions 54, allowing the carrier 14 to rotate about the secondary axis. In the preferred form, the carrier 14 further includes one or more arms 62 extending from the central portion 48. The handler 16 is attached to each of the one or more arms 62. The arm 62 may comprise two parallel supports extending from the central portion 48 having a crossbar 64 running between the supports, with the handlers 16 mounted to the crossbars 64 intermediate the supports. In the preferred form, three arms 62 are attached to the central portion 48. The three arms 62 are equidistantly spaced from one another about the central portion 48. In this preferred form, the three arms 62 extend tangentially from three points spaced at one-hundred and twenty degree intervals about a circle having a central point located on the secondary axis.

The arms 62 are therefore offset from the secondary axis by a distance equal to the radius of the circle and extend tangentially from a point on the circle. Additionally, the handler 16 is offset from the point on the circle from which arms 62 tangentially extend. Thus, each handler 16 is circumferentially spaced equidistantly about the carrier 14 around the secondary axis. The handlers 16 are each spaced from the secondary axis by the second radial spacing. In the most preferred form, handlers 16 are not operationally rotatable relative to the carrier 14.

In one preferred embodiment of the invention, the second radial spacing is larger than the first radial spacing. The larger second radial spacing allows the rotary unloader 10 of the most preferred form of the present invention to maintain an outward disposition of articles 26 being transported by the handlers 16 without the use of additional mechanisms or axes of rotation. The outward disposition is with respect to the primary axis. Thus, the outward disposition prevents the rotation of the carrier 14 from moving the article 26 being transported between the primary axis and the secondary axis. This obviates the difficulty of having the structure of either the carrier 14 or the carriage 12 limit the size of the articles 26 that may be transported. Other rotary unloaders, by failing to maintain an outward disposition, allow the structure of the carrier 14 or carriage 12 to limit the size of the articles 26 to be transported.

Furthermore, the larger second radial spacing of the present invention reduces the rotational movement of the article 26 during transport, while allowing for reciprocal movement during both unloading from the magazine 24 and placement of the article 26 on the receiver 30. Rotary unloaders employing a smaller second radial spacing require that rotation about the secondary axis be faster than rotation about the primary axis to produce comparable linearity in the reciprocal movement. This then requires a complete rotation about the secondary axis between unloading the article 26 and placing the article 26. The larger second radial spacing of the present invention obviates that need. This reduces the motion of the article 26, thus providing more reliable operation.

In the preferred form, the carriage 12 may be rotated by any suitable drive 70 such as through a timing belt. In one preferred form, rotation of the carriage 12 about the primary axis also provides for a counter rotation of the carrier 14 about the secondary axis. By way of example and not limitation, a stationary gear 74 can be mounted on the housing 40 coaxial with the primary axis and the carriage 12. A planetary gear 76 is mounted on the shaft 60 of the central portion 48 of the carrier 14 to rotate with the carrier 14 about the secondary axis. An idler gear 78 is rotatably mounted on the extension 54 of the carriage 12 and engages the stationary gear 74 and the planetary gear 76. During rotation of the carriage 12 about the primary axis, the planetary gear 76 and the idler gear 78 also rotate about the primary axis. Rotation of the carrier 14 about the primary axis causes rotation of the idler gear 78 in the same direction. Rotation of the idler gear 78 then causes rotation of the planetary gear 76 in an opposing direction.

The use of the idler gear 78 causes the rotation of the carrier 14 in an opposite direction relative to the carriage 12. These opposing rotations produce a cycle of reciprocal movements for the handler 16, as determined by the gear ratio between the stationary gear 74 and the planetary gear 76. In one example embodiment, the gear ratio is 1:3, producing four reciprocal movements per one rotation about the secondary axis. In this embodiment, the magazine 24 containing articles 26 and the receiver 30 may be placed ninety degrees from one another along an arc relative to the primary axis. This arrangement allows the rotary unloader 10 to move the handler 16 through a reciprocal movement to engage the article 26 in the magazine 24 and deposit the article 26, during the subsequent reciprocal movement, on the receiver 30. In one preferred form, the stationary gear 74, idler gear 78 and planetary gear 76 may comprise spur gears. Those skilled in the art will appreciate that other types of gears or drivers, along with other gear ratios, may be employed to rotate the carriage 12 and carrier 14 without departing from the spirit or scope of the invention.

As shown above, multiple handlers 16 may be attached to the carrier 14. Multiple handlers 16 allow the rotary unloader 10 to transport one article 26 with each handler 16 during a single cycle, providing for more efficient operation. By employing a single carrier 14, the rotary unloader 10 of the present invention eliminates the necessity for a separate gear system for each handler 16. According to the preferred teachings of the present invention, the mechanism necessary to employ multiple handlers 16 is greatly simplified. For example, as shown above with respect to one preferred form, the carrier 14 may comprise a central portion 48 having three arms 62. Thus, the single gear system including gears 74, 76 and 78 provides for rotation of all three handlers 16 of the preferred form. Prior rotary systems employing multiple handlers, each rotating about a different secondary axis, require a separate system to drive rotation of each handler. Rotary unloaders that employ three handlers 16 each rotatable about a distinct secondary axes must provide rotational movement through three distinct gear systems.

The handler 16 provides for engagement with the article 26 in the magazine 24 and transport of the article 26 to the receiver 30. In one preferred embodiment of the invention, the handler 16 may comprise a pair of suction cups. During engagement of the handler 16 with the article 26 in the magazine 24, a source vacuum is in fluid communication with the suction cups so that the suction cups engage the article 26 through the partial vacuum at the point of engagement. During the reciprocal movement of the handler 16 away from the magazine, the article 26 is unloaded from the magazine 24.

Fluid communication between the handlers 16 and the vacuum source may be provided, by way of example, through a connection between the vacuum source and the carriage 12. The carriage 12 provides an internal bore in the shaft 46 in communication with an internal bore in the shaft 60 of the central portion 48 of the carrier 14 by rotating unions. The shaft 60 of the central portion 48 may provide suction to the handler 16 such as through hoses. Those skilled in the art will appreciate that other methods of engaging articles 26 in the magazine 24 with the handler 16 may be employed without departing from the scope of the invention.

Because the article 26 is removed during a reciprocal movement, movement of the article 16 after engagement is in a direction generally away from the magazine 24. The rotary unloader 10 has minimal movement of the handler 16 across the magazine 24, thus providing for more reliable operation. For example, a rotary unloader 10 employing the preferred teachings of the invention to remove a corrugated tray from a magazine 24 reduces the problem of roll back into a tray behind the tray being removed. The rotary unloader 10 further reduces rotational movement of the article 26 during transport between engagement and placement of the article 26. Because of the faster rotation of the carriage 12, the article 26 only moves through a ninety degree rotation about the secondary axis. In the preferred form shown, the two hundred seventy degree rotation about the primary axis is used for the reciprocal movement.

In the preferred form of the invention, a subsequent reciprocating motion of the handler 16 places the article 26 on the receiver 30. The reciprocal motion allows for less violent placement of the article 26, once again providing for more reliable and faster operation. In one example embodiment, the receiver 30 may comprise an endless conveyor 90. In the preferred form, flights or lugs are spaced along the endless conveyor 90 to capture the article 26 upon placement. As the handler 16 places each article 26 upon the receiver 30, the flights engage opposite sides of the article 26 and convey the article 26 for further processing. In one embodiment, the placement on the receiver 30 by the handler 16 causes the flights to engage the article 26 so as manipulate the article 26 into a desired conformation. For example, where the articles 26 are corrugated trays, the placement of the corrugated trays onto the receiver 30 engages the corrugated trays to cause the corrugated blank to bend along fold lines. This may, by way of example, shape the blank into a tray or box conformation.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. An apparatus for removing articles from a magazine, comprising, in combination:
    a frame;
    a carriage mounted for rotation about a primary axis, with the carriage including first and second carriage shafts rotatably mounted to the frame about the primary axis, with each carriage shaft including a radial extension rotatable with the carriage shaft about the primary axis;
    a carrier attached to the carriage and mounted for rotation about a secondary axis having a first radial spacing from the primary axis, with the carrier including a carrier shaft extending between the radial extensions and alone the secondary axis; and
    a plurality of handlers attached to the carrier at a second radial spacing from the secondary axis, with the plurality of handlers being fixed to the carrier and rotating about the secondary axis in a same rotational position with the carrier relative to the carriage, with the carrier rotating about the secondary axis and the carriage simultaneously rotating about the primary axis to produce a reciprocating movement for each of the plurality of handlers in turn and disposing each of the plurality of handlers to remove an article from the magazine during one reciprocating movement and to place the article on a receiver during a subsequent reciprocating movement.

2. The apparatus of claim 1 with the first radial spacing being smaller than the second radial spacing, allowing the plurality of handlers to maintain an outward disposition relative to the primary axis.

3. The apparatus of claim 1 with the ratio of the rotation of the carriage about the primary axis to the rotation of the carrier about the secondary axis being greater than 1:1.

4. The apparatus of claim 1 with the plurality of handlers comprising three handlers equidistantly and circumferentially spaced on the carrier.

5. The apparatus of claim 1 with each of the plurality of handlers comprising a pair of suction cups.

6. The apparatus of claim 1 further comprising, in combination: a stationary gear mounted on the frame coaxial with the primary axis; an idler gear engaging the stationary gear; and a planetary gear mounted coaxial with the secondary axis and connected to rotate with the carrier and engaging the idler gear, with rotation of the carriage about the primary axis driving rotation of the carrier about the secondary axis.

7. The apparatus of claim 1 with the receiver comprising, in combination: a conveyor for transporting the article for further processing.

8. An apparatus for removing articles from a magazine, comprising, in combination:
    a frames;
    a carriage mounted for rotation about a primary axis, with the carriage including first and second carriage shafts rotatably mounted to the frame about the primary axis, with each carriage shaft including a radial extension rotatable with the carriage shaft about the primary axis;
    a carrier attached to the carriage and mounted for rotation about a secondary axis having a first radial spacing from the primary axis, with the carrier including a carrier shaft extending between the radial extensions and along the secondary axis; and
    a handler attached to the carrier at a second radial spacing from the secondary axis, with the plurality of handlers being fixed to the carrier and rotating about the secondary axis in a same rotational position with the carrier relative to the carriage, with the first radial spacing being smaller than the second radial spacing, with the carrier rotating about the secondary axis and the carriage simultaneously rotating about the primary axis to produce a reciprocating movement for the handler and with the handler removing an article from the magazine during one reciprocating movement and placing the article on a receiver during a subsequent reciprocating movement.

9. The apparatus of claim 8 further comprising additional handlers attached to the carrier.

10. The apparatus of claim 9 with the additional handlers having the same radial spacing from the secondary axis as the handler, and being equidistantly and circumferentially spaced about the carrier.

11. A method for removing an article from a magazine comprising:
    rotating a carriage about a primary axis, with the carriage including first and second carriage shafts rotatably mounted to a frame about the primary axis, with each carriage shaft including a radial extension rotatable with the carriage shaft about the primary axis;
    rotating a carrier attached to the carriage about a secondary axis, with the carrier including a carrier shaft extending between the radial extensions and alone the secondary axis, with the secondary axis offset from the primary axis by a first radial spacing, with the carrier having a plurality of handlers attached at a second radial spacing from the secondary axis, with the plurality of handlers being fixed to the carrier and rotating about the secondary axis in a same rotational position with the carrier relative to the carriage;
    engaging an article held in the magazine with one of the plurality of handlers, with the rotation of the carriage and the rotation of the carrier allowing each of the plurality of handlers to engage an article held in the magazine in a sequential fashion, with the rotation of the carriage about the primary axis and the rotation of the carrier about the secondary axis cooperating to produce a reciprocating movement during engagement of the article by the handler; and placing the article on a receiver with the one of the plurality of handlers, with the rotation of the carriage and the rotation of the carrier allowing each of the plurality of handlers to place the article on the receiver in a sequential fashion, with the rotation of the carriage about the primary axis and the rotation of the carrier about the secondary axis cooperating to produce a reciprocating movement during placement of the article by the one of the plurality of handlers.

12. The method of claim 11 with the first radial spacing being smaller than the second radial spacing.

13. The method of claim 11 with the ratio of the rotation of the carriage about the primary axis to the rotation of the carrier about the secondary axis being greater than 1:1.

14. The method of claim 11 with the plurality of handlers comprising three handlers equidistantly and circumferentially spaced on the carrier.

15. The method of claim 14 with each of the plurality of handlers comprising a pair of suction cups, with engaging the article held in the magazine comprising: contacting the suction cups with the article in the magazine to remove the article from the magazine with the suction cups being in communication with a vacuum.

16. The method of claim 11 with rotating the carrier attached to the carriage about the secondary axis comprising: engaging a stationary gear mounted on the frame and coaxial with the carriage with an idler gear; engaging the idler gear with a planetary gear coaxial with the carrier and connected to rotate with the carrier, with engaging the idler gear causing rotation of the carrier about the secondary axis in an opposite direction to the rotation of the carriage about the primary axis.

17. The method of claim 11 with placing the article on the receiver comprising placing the article on a conveyor for transport to further processing.

18. A method for removing an article from a magazine comprising:

rotating a carriage about a primary axis, with the carriage including first and second carriage shafts rotatably mounted to a frame about the primary axis, with each carriage shaft including a radial extension rotatable with the carriage shaft about the primary axis;

rotating a carrier attached to the carriage about a secondary axis, with the carrier including a carrier shaft extending between the radial extensions and along the secondary axis, with the secondary axis offset from the primary axis by a first radial spacing, with the carrier having a handler attached at a second radial spacing from the secondary axis, with the first radial spacing being smaller than the second radial spacing to maintain an outward disposition of the handler, with the handler being fixed to the carrier and rotating about the secondary axis in a same rotational posit on with the carrier relative to the carriage;

engaging articles held in a magazine with the handler, with the rotation of the carriage and the rotation of the carrier allowing the handler to engage an article held in the magazine, with the rotation of the carriage about the primary axis and the rotation of the carrier about the secondary axis cooperating to produce a reciprocating movement during engagement of the article by the handler; and placing the article on a receiver with the handler, with the rotation of the carriage and the rotation of the carrier allowing the handler to place the article on the receiver in a sequential fashion, with the rotation of the carriage about the primary axis and the rotation of the carrier about the secondary axis cooperating to produce a reciprocating movement during placement of the article by the handler.

19. The method of claim 18 with rotating the carrier comprising rotating the carrier including additional handlers attached to the carrier.

20. The method of claim 19 with the additional handlers having the same radial spacing from the secondary axis as the handler, and being equidistantly and circumferentially spaced about the carrier.

* * * * *

UNITED STATES PATENT AND TRADEMARK OFFICE
CERTIFICATE OF CORRECTION

PATENT NO. : 6,837,664 B2
DATED : January 4, 2005
INVENTOR(S) : Donovan R. Blakesley et al.

It is certified that error appears in the above-identified patent and that said Letters Patent is hereby corrected as shown below:

Column 3,
Line 24, after ""first"", please insert -- "second" --;

Column 7,
Line 45, please delete "alone" and insert -- along --;

Column 8,
Line 55, please delete "alone" and insert -- along --;

Column 10,
Line 16, please delete "posit on" and insert -- position --.

Signed and Sealed this

Fifth Day of April, 2005

JON W. DUDAS
*Director of the United States Patent and Trademark Office*